June 17, 1930.  W. BRESTERS  1,763,878
TESTING SYSTEM
Filed Oct. 26, 1928    4 Sheets-Sheet 1

INVENTOR
W. BRESTERS
BY
M. R. McKenney
ATTORNEY

June 17, 1930.  W. BRESTERS  1,763,878
TESTING SYSTEM
Filed Oct. 26, 1928   4 Sheets-Sheet 2

INVENTOR
W. BRESTERS
BY
M.R. McKenney
ATTORNEY

June 17, 1930.   W. BRESTERS   1,763,878
TESTING SYSTEM
Filed Oct. 26, 1928   4 Sheets-Sheet 4

INVENTOR
W. BRESTERS
BY
ATTORNEY

Patented June 17, 1930

1,763,878

UNITED STATES PATENT OFFICE

WILLIAM BRESTERS, OF BERWYN, ILLINOIS, ASSIGNOR TO WESTERN ELECTRIC COMPANY, INCORPORATED, OF NEW YORK, N. Y., A CORPORATION OF NEW YORK

TESTING SYSTEM

Application filed October 26, 1928. Serial No. 315,115.

This invention relates to telephone systems and particularly to testing means for automatic telephone systems.

An object of this invention is to improve and simplify the testing of automatic switches.

Heretofore systems have been used for testing for short-circuited, opened, and reversed wires and for other troubles that are likely to occur in connections for automatic switches.

According to the present invention an advantage has been secured over the testing systems previously used by means of a testing device arranged so that one series of switches already tested may be disconnected from the device and another series connected thereto for testing while a third series is being tested.

Another feature is a testing device for testing two-motion switches which is so arranged that the wipers of such switches are directed to travel over the terminals of succeeding groups by releasing the switch in regard to its secondary directive movements only while transferring from one group to another.

Another feature is the provision of means in the testing devices whereby the connections between two or three switches may be tested automatically. If two switches are connected for testing, the testing device simply proceeds with the test and indicates when it is completed, whereas if three switches are connected for test, the testing device proceeds with the testing of the connection between the first and the second switch and when this test is completed it proceeds automatically to test the connection between the second and the third switch.

Figure 1:
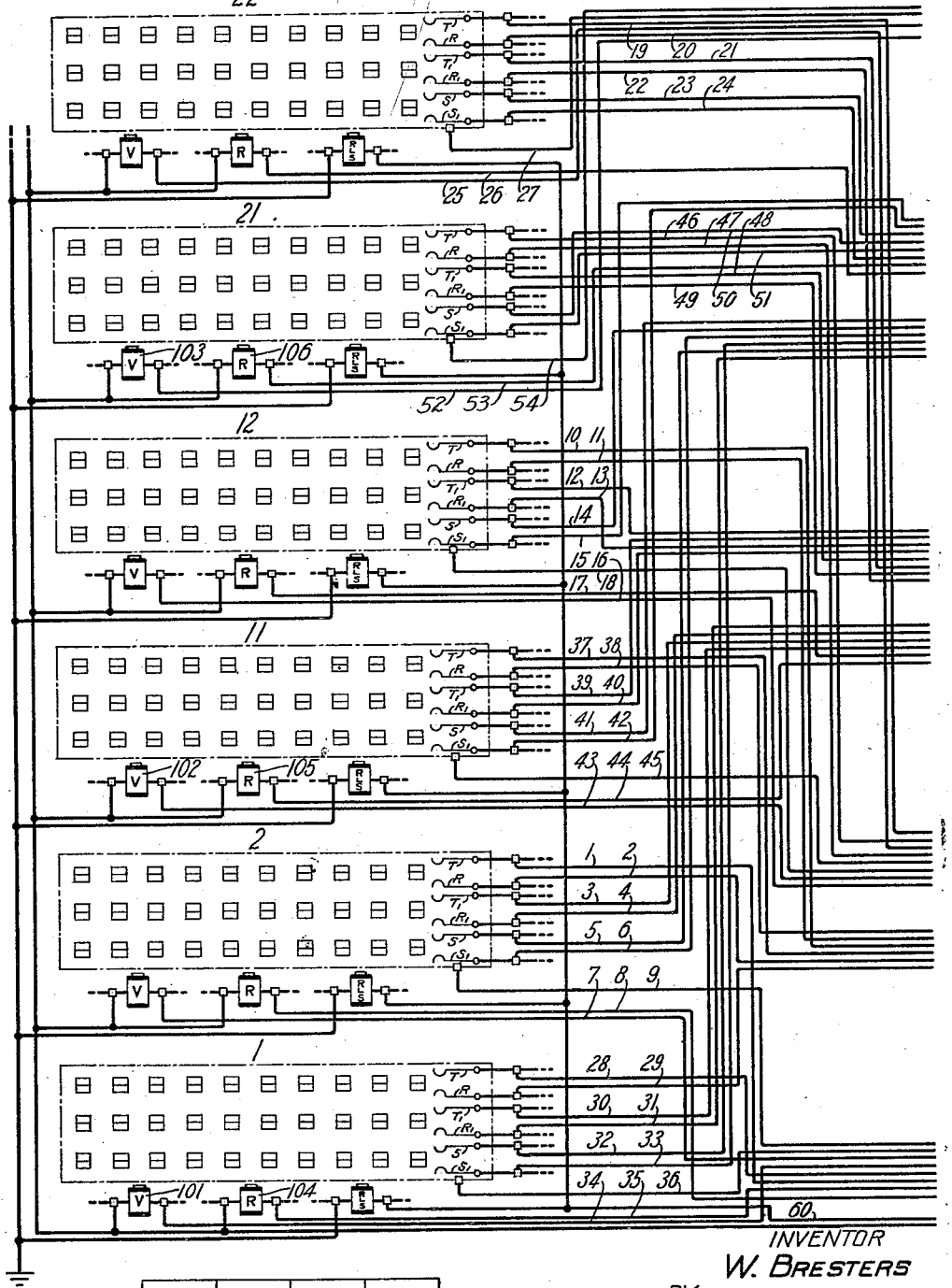
Figure 2:
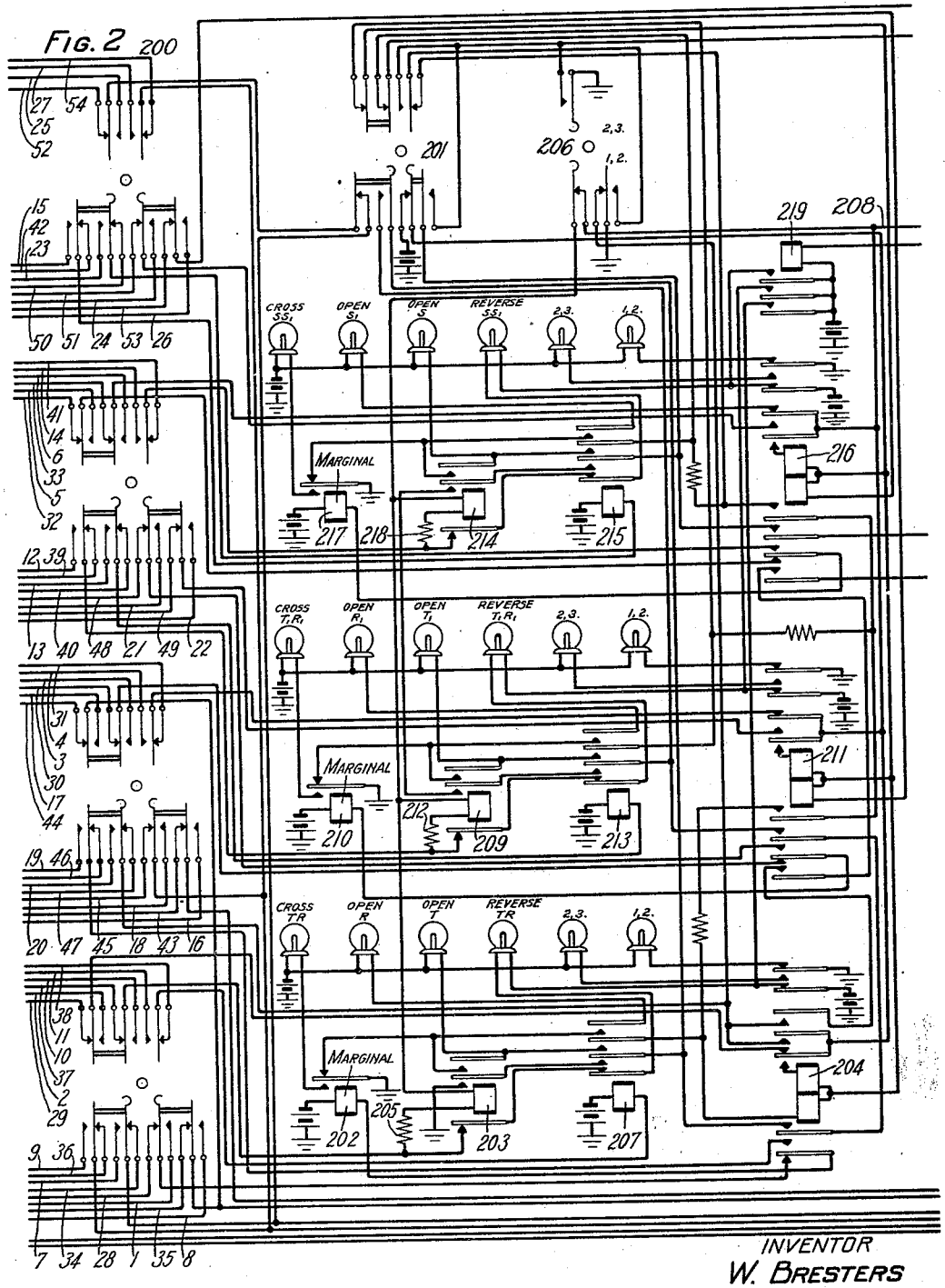
Figure 3:
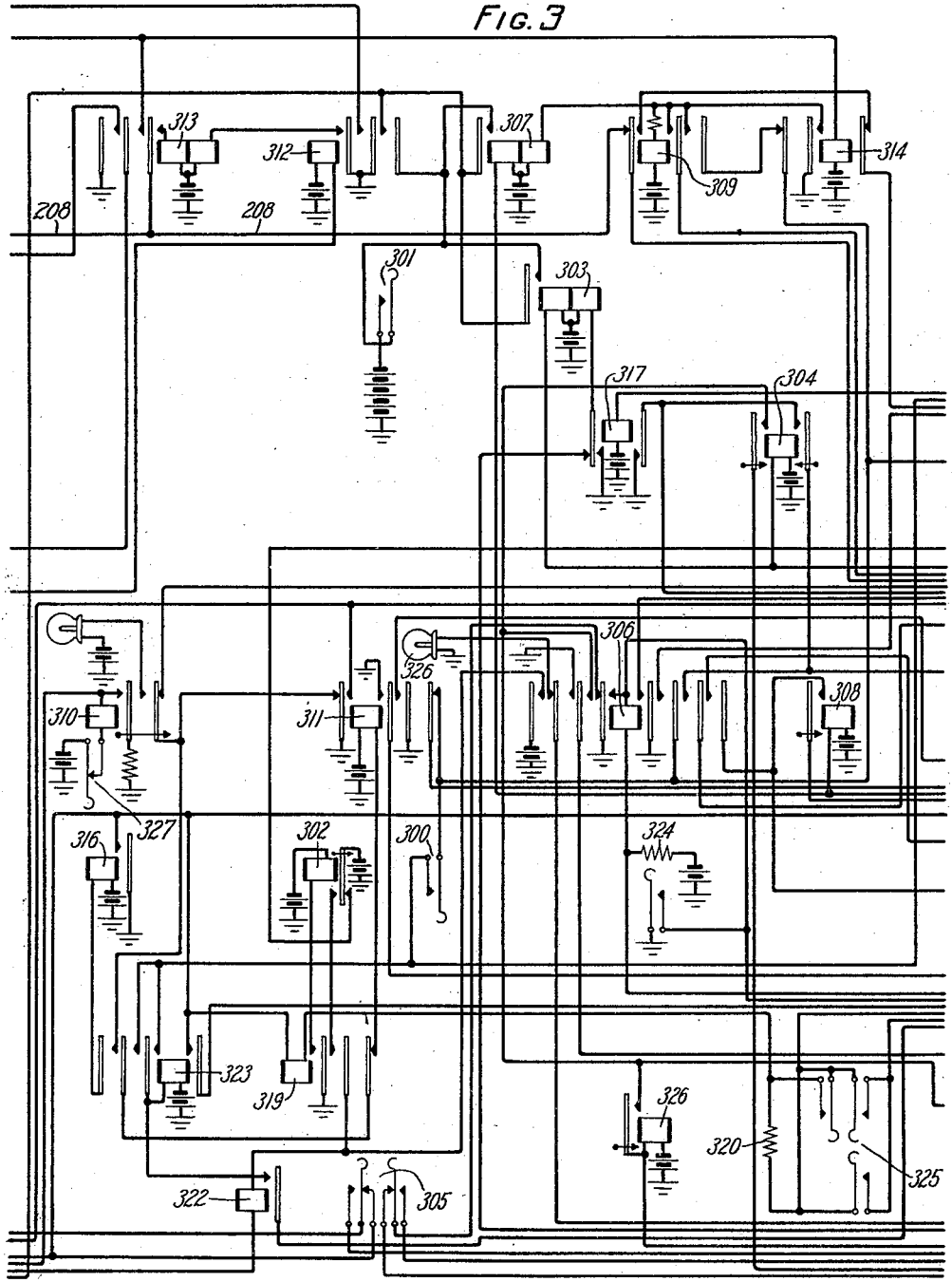
Figure 4:
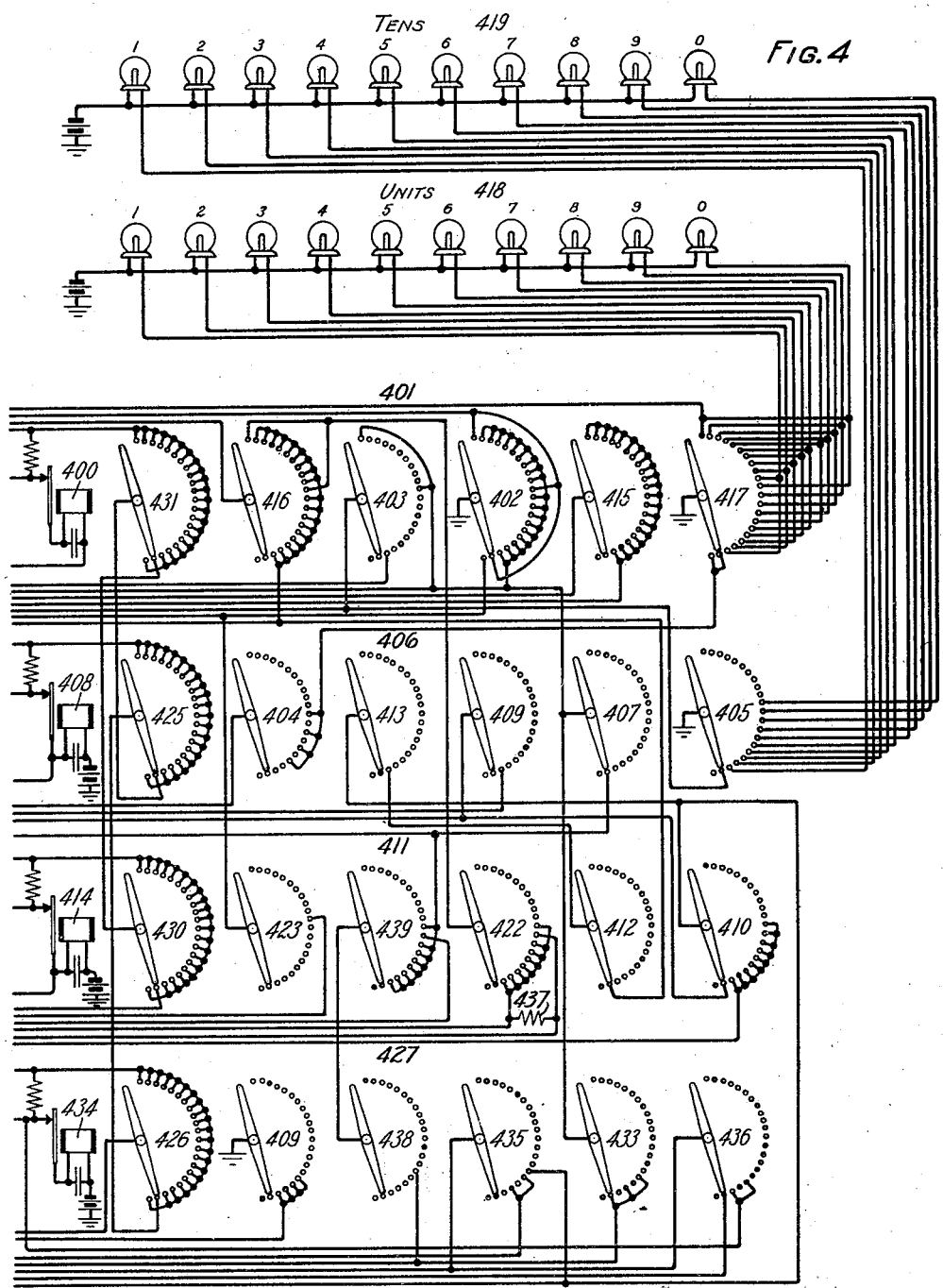

The invention has been illustrated in the accompanying drawings, in which Fig. 1 shows in diagrammatic form portions of a plurality of automatic switches and the manner in which they may be connected for testing, while Figs. 2, 3 and 4 show a testing device embodying the features of this invention. Fig. 2 shows primarily keys for transferring the testing device from one series of switches connected for testing to another connected series of switches, and signaling lamps to indicate test conditions. Fig. 3 shows miscellaneous control relays, keys and signaling lamps employed in this device, while Fig. 4 shows step by step selector switches for controlling the progress of the tests, and signals for visually indicating this progress. Figs. 1 to 4 should be arranged as illustrated in Fig. 5.

Referring now to the drawings, the testing device is so arranged that groups of switches, such as line finders for example, of a different number of switches in each group may be tested. In Fig. 1 has been shown the first row or level of terminals of each of 6 switches of a group of 30. Switches 1, 2, 11, 12, 21 and 22 have been indicated for reasons which will be hereinafter described. The testing device has also been arranged for the testing of two other groups of 20 and 16 switches respectively.

To test a group of 30 switches the connections from the testing device are changed eight successive times and the testing of the switches is arranged as follows:

First test between switches 1, 11 and 21
Second test between switches 2, 12 and 22
Third test between switches 3, 13 and 23
Fourth test between switches 4, 14 and 24
Fifth test between switches 5, 15 and 25
Sixth test between switches 6, 16 and 26
Seventh test between switches 7, 17 and 27
Eighth test between switches 8, 18 and 28
Ninth test between switches 9, 19 and 29
Tenth test between switches 10, 20 and 30

To test a group of 20 switches the connections from the testing devices are also changed eight successive times and the testing of the switches is arranged as follows:

First test between switches 1 and 11
Second test between switches 2 and 12
Third test between switches 3 and 13
Fourth test between switches 4 and 14
Fifth test between switches 5 and 15
Sixth test between switches 6 and 16
Seventh test between switches 7 and 17
Eighth test between switches 8 and 18
Ninth test between switches 9 and 19
Tenth test between switches 10 and 20

To test a group of 16 switches the connections from the testing device are changed six successive times and the tests are as follows:

First test between switches 1 and 11
Second test between switches 2 and 12
Third test between switches 3 and 13
Fourth test between switches 4 and 14
Fifth test between switches 5 and 15
Sixth test between switches 6 and 16
Seventh test between switches 7 and 9
Eighth test between switches 8 and 10

It will be noted that by arranging the testing of the switches in in this manner the number of changes that have to be made are reduced to a minimum. For example, in the case of the 30 switch test the switches 1, 11 and 21 are connected to the normal contacts of the transfer keys 200 in Fig. 2 while the switches 2, 12 and 22 are connected to the alternate contacts of these keys. In this manner the first three switches mentioned will be tested with the transfer keys in normal and the second three switches mentioned will be tested with the transfer keys operated. When the transfer keys have been operated and while the second group of switches are being tested the first group of switches may be disconnected from the keys and switches 3, 13 and 23 connected in their places, and when the transfer keys are returned to normal and while this third group of switches is being tested, the second group of switches may be disconnected and switches 4, 14 and 24 connected in their places. Proceeding in this manner only eight successive changes need to be made during the testing of the groups of 30 and 20 switches each, while only six successive changes need to be made during the testing of the group containing 16 switches.

The connections required for each switch to prepare it for testing are as follows:

Connections from the transfer keys to the six wipers T, R, $T_1$, $R_1$, S and $S_1$. These connections are made for testing opened, short-circuited and reversed wires among the multiple connections between the switches under test, connections to the frames of the switches to be tested for short-circuits and connections to the windings of the vertical, rotary and release magnets to put them under control of the testing device. In connecting a switch for testing the normal battery connections for the switches are removed. Battery connections for the lines to which the switches have access are also disconnected in order that the switches during their testing operation may not disturb the conditions on these lines.

A description will now be made of the procedure in testing a group of 30 switches. The testing may begin automatically with switches, 1, 2, 11, 12, 21 and 22 connected as shown in Fig. 1 and with the transfer keys 200 and control keys 201 and 206 in normal positions and the start key 300 and the power key 301 operated and with key 325 operated to close its upper contacts. The first effect will be the closing of a circuit for the operation of the magnet 400 of the selector 401 as follows: battery, armature and back contact of relay 302, winding of magnet 400 and its self-interrupting contacts, key 300, brush of bank 402 in position 2 to ground. Selector 401 is thereby shifted to place its brushes in position 3. In this position the battery supply relay 303 is operated as well as the vertical magnets 101, 102 and 103 of switches 1, 11 and 21. The circuit for relay 303 may be traced from battery through the left hand winding of this relay, brush of bank 403, position 3 of the selector 401 and brush of bank 405, position 2 of the selector 406 to ground. The circuit for vertical magnet 101 may be traced from battery through the key 301, armature and front contact of relay 303, vertical magnet 101, lead 34, transfer key 200, brush of bank 407, brush of bank 402 to ground. The circuit for vertical magnet 102 may be traced from the same battery through lead 43 and the transfer key 200 to the ground at brush of bank 402, while the circuit for vertical magnet 103 may be traced from the same battery through lead 52 and keys 200 and 201 to the same ground. Relay 304 also operates from the ground at the brush of bank 405 over an obvious circuit. This relay, however, is slower in its operation than relay 303 so it will not operate until the vertical magnets have been operated to advance the brushes of the switches to the first level.

When relay 304 does operate the stepping magnet 408 for selector 406 is operated over a circuit as follows: from battery through the winding and the self-interrupting contact of magnet 408, right hand armature and front contact of relay 304, brush of bank 405 to ground. Magnet 408 in operating moves the brushes of selector 406 to position 3. In in this position the circuits for the vertical magnets are opened and circuits for the rotary magnets of switches 1 and 11 closed as well as the circuit for the battery supply relay 307 for these rotary magnets. The circuit for relay 307 may be traced from battery, left hand winding of this relay, brush of bank 409, position 3, brush of bank 410, position 2 of selector 411, key 305, inner left hand armature and back contact of relay 306 to ground. Relay 307 in operating closes the circuit from battery for the rotary magnets 104 and 105. The circuit for magnet 104 is as follows: from battery through contacts of key 301, armature and front contact of relay 307, rotary magnet 104, lead 35, transfer key 200, brush of bank 412 of selector 411, brush of bank 413, key 305, inner left hand armature and back contact of relay 306 to ground. The circuit for the rotary magnet 105 may be traced from the same battery through lead 44 and the same ground at relay 306. The operation of these two rotary magnets will advance the brushes of switches 1 and 11 to the first sets of terminals in the first levels of these two switches. The slow to operate relay 308 is also operated by the same ground at relay 306 from battery through its winding. Relay 308 does not operate until the rotary magnets have operated. When the selector 406 shifted to position 3, relays 303 and 304 were released; relay 303 to open the battery connection for the vertical magnets and relay 304 to open the circuit for magnet 408 of selector 406. Relay 308 in operating closes a circuit for the operation of magnet 414 of selector 411 to switch its brushes to position 3. The circuit for this magnet may be traced from battery through the winding and the self-interrupting contact of magnet 414, armature and front contact of relay 308, brush of bank 410, position 2, key 305, inner left hand armature and back contact of relay 306 to ground. When selector 411 switches to position 3 the brush of bank 410 opens the circuits for relays 307 and 308 and the circuits for the rotary magnets. The selectors 401, 406 and 411 are now in their positions 3 and switches 1 and 11 are ready to be tested in regard to the multiple connections between the terminals of the first lines.

If no irregularities are encountered in the connections between these two switches, lamps T, R, $T_1$, $R_1$, S and $S_1$ are lighted. The operations leading to the lighting of these lamps are as follows. If the connection between the tip terminals of switches 1 and 11 is completed over the multiple leads, a circuit will be established through relays 202 and 203 as follows: battery, winding of relay 202, lower, outer armature and back contact of relay 204, key 200, lead 28, tip brush of switch 1 multiple connection from the tip terminal of the first set of terminals of this switch to the corresponding tip terminal of switch 11, tip brush of this switch, lead 37, key 200, resistance 205, winding of relay 203, normal contacts of trouble key 206, lead 208, left hand armature and back contact of relay 309, brush of bank 415, position 3, outer right hand armature and back contact of relay 310, left hand armature and back contact of relay 311 to ground. Due to the resistance 205 in this circuit the marginal relay 202 will not operate, but relay 203 operates to close a circuit for lamp T as follows: battery, lamp T, upper outer armature and front contact of relay 203, to ground at the armature and back contact of relay 102. If the connection is completed between the ring terminals of switches 1 and 11, a circuit will be completed for relay 207 from battery, winding of relay 207, key 200, lead 38, ring brush of switch 11 and ring terminals of the first line through the multiple connection to the corresponding ring terminal of switch 1, ring brush of this switch, lead 29, key 200, upper inner armature and back contact of relay 204, conductor 208, to the ground at the left hand armature and back contact of relay 311, as hereinbefore described. The operation of relay 207 closes a circuit for the lighting of lamp R, from battery through lamp R, upper outer armature and front contact of relay 207, armature and back contact of relay 202, to ground. If the connection for the $T_1$ brushes is completed through the switches 1 and 11, a circuit will be completed for the operation of relay 209 as follows: battery, winding of relay 210, third lower armature and back contact of relay 211, key 200, lead 30, $T_1$ brushes and terminals and the multiple connection between switches 1 and 11, lead 39, key 200, resistance 212, winding of relay 209 to the ground heretofore traced for the operation of relay 203 over lead 208. Relay 209 in operating completes the circuit for the lighting of lamp $T_1$ from battery through this lamp, upper outer armature and front contact of relay 209 to ground at the armature and back contact of relay 210. If the multiple connection between the brushes $R_1$ of switches 1 and 11 is intact, relay 213 will operate over a circuit from battery through the winding of this relay, key 200, lead 40, $R_1$ brushes and terminals of switches 1 and 11 and the multiple connection therebetween to lead 31, key 200, second upper armature and back contact of relay 211, to the ground over lead 208. Relay 213 in operating closes the circuit for the lighting of lamp $R_1$ from battery through this lamp, upper outer armature and front contact of relay 213, to ground at the front armature and back contact of relay 210. Similarly if the circuits for the S and $S_1$ brushes of switches 1 and 11 are completed through the multiple connections, relays 214 and 215 will be operated through obvious circuits over leads 32 and 41 and 42 and 33. The lamps S and $S_1$ are thereby lighted through circuits completed by the operation of relays 214 and 215 to ground.

When relays 203 and 207 have operated a circuit is completed for the operation of relay 204 as follows: battery, key 201, lower winding of relay 204, third outer armature and front contact of relay 207, outer upper armature and front contact of relay 203 to ground at the armature and back contact of relay 202. Similarly the operations of relays 209 and 213 will close a circuit for the operation of relay 211. In this case the circuit may be traced from the battery at key 201 through the lower winding of relay 211, other contacts of key 201, armatures and front contacts of relays 213 and 209, to ground at relay 210. Relays 214 and 215 also close an obvious circuit for relay 216 through its lower winding and contacts of key 201. These three relays in operating provide locking circuits for themselves to the ground over lead 208, open the circuits for relays 203, 207, 209, 213, 214 and 215 and also remove the battery from the reverse lamps TR, T₁R₁ and SS₁ to prevent false operation of these lamps at this time. A circuit for relay 312 is also prepared from battery through the winding of this relay, lower outer armatures and front contacts of relays 216 and 211 and third upper armature and front contact of relay 204 to ground at the trouble key 206. Relay 312 in operating closes a connection from the battery supply for the operation of the rotary magnet 106. This circuit may be traced from battery, key 301, outer right hand armature and front contact of relay 312, winding of magnet 106, lead 53, key 200, middle right hand armature and front contact of relay 312. This magnet net 106 now operates to advance the brushes of switch 21 to contact with the terminals of the first row for the testing of the multiple connection between switch 11 and switch 21. Relay 313 is also operated by the operation of relay 312 over an obvious circuit. This relay locks through the connection to ground over lead 208. Relay 313 closes an obvious circuit for the operation of relay 219 which replaces the battery for the reverse lamps TR, T₁R₁ and SS₁.

The test circuit through the brushes of switch 21 and switch 11 and the multiple connections of the first set of terminals of these switches may be traced as follows: for the tip connection, battery, winding of relay 202, lower outer armature and front contact of relay 204, key 200, lead 46, tip brush of switch 21, multiple connection to switch 11, tip brush of switch 11, lead 37, key 200, resistance 205, winding of relay 203 to ground over lead 208. For the ring connection, battery, winding of relay 207, key 200, lead 38 over the ring connection, lead 47, key 200 to ground at trouble key 206. The T₁ connection for relay 209 will extend from battery, through winding of relay 210, third lower armature and front contact of relay 211, key 200, lead 48, T₁ connection, lead 39, resistance 212, winding of relay 209 to ground over lead 208. The R₁ connection for relay 213 will extend through leads 40 and 49 second upper armature and front contact of relay 211 to ground on lead 208. The S connection for relay 214 will extend from battery, winding of relay 217, third lower armature and front contact of relay 216, lead 50, S connection, lead 41, resistance 218, winding of relay 214 to ground on lead 208, while the S₁ connection for relay 215 will extend from battery through winding of relay 215, lead 42, S₁ connection lead 51, the second upper armature and front contact of relay 216 to ground on lead 208. Relays 203 and 207 will operate to light lamps T and R. Relays 209 and 213 will operate to light lamps T₁ and R₁, while the operation of relays 214 and 215 will operate to light lamps S and S₁. The lighting of these lamps the second time indicates that conditions on the multiple connections between switches 11 and 21 are standard.

After these relays have operated and due to the operation of relay 313, a circuit is now completed for the operation of relay 314 as follows: battery, winding of relay 314, middle left hand armature and front contact of relay 313, second lower armature and front contact of relay 216, second upper armature and front contact of relay 215, inner upper armatures and front contacts of relays 214 and 209, second upper armature and front contact of relay 213, second lower armature and front contact of relay 211, inner lower armature and front contact of relay 204, second upper armature and front contact of relay 207, upper inner armature and front contact of relay 203 to ground. Relay 314 in operating closes an obvious circuit for the operation of relay 309 and also provides an energizing circuit for relay 307 which in operating supplies battery for the operating magnets of switches 1, 11 and 21 as hereinafter to be described. Relay 309 in operating provides a locking circuit for itself through its inner right hand armature and front contact to ground on the brush of bank 402. While relay 309 opens the circuit to ground a relay 311 for lead 208 thus causes the release of relays 203, 207, 209, 213, 214 and 215 and these relays in releasing extinguish the lamps under control of these relays. These relays in releasing open the circuit for relay 314 which is now also released.

Relay 314 in releasing closes the operating circuit for magnet 400, of switch 401 as follows: battery, armature and back contact of relay 302, winding and self-interrupting contacts of magnet 400, outer left hand armature and back contact of relay 314, outer right hand armature and front contact of relay 309, inner right hand armature and front contact of relay 309 to ground at the brush of bank 402. The brushes of the switch 401 are now advanced to position 4, but this shifting of the brushes of switch 401 does not take place until the rotary magnets 104 and 105, of switches 1 and 11, are operated as the contacts of relay 314 are arranged to close the connection through its right hand armature and back contact before it closes the connection through its outer left hand armature and back contact. These rotary magnets are operated over the following circuit: battery, through contacts of key 301, armature and front contact of relay 307, and in parallel through windings of magnets 104 and 105, and leads 35 and 44, through key 200, brush of bank 416, position 3, back contact of relay 314, front contact of relay 309, brush of bank 415, position 3, back contacts of relays 310 and 311 to ground.

The testing of the connections between the first set of terminals of switches 1, 11 and 21 is now completed; the selector 401 has been advanced to position 4 and the brushes of switches 1 and 11 have been advanced to connect with the second set of terminals to test the connection between these two switches at this point. As switch 401 is advanced to the 4th position, relay 309 is released. The testing of the second and the remaining sets of terminals in the first level of switches 1, 11 and 21 is done in the same manner as hereinbefore described for the first set of terminals of these three switches. Further description along these lines is therefore considered unnecessary, except to say that the selector 401 is actuated to shift its brushes one step for each set of contacts tested in this level.

It should, however, be observed that on the first step of the brush of bank 417 of selector 401, a connection is established for the lamp #1 of the set of ten unit lamps 418 and that on each succeeding step the corresponding lamp in this series is lighted to indicate the sets of terminals tested. Similarly, the first operation of switch 406 will cause a connection to be made from ground through the brush of bank 405 for the lamp #1 of the set of ten tens lamps 419 to indicate that testing is taking place in the first level of the switches.

The lamps 1—2 and 2—3 will indicate whether testing is taking place between switches 1 and 11 or between switches 11 and 21. It will be noted that lamps 1—2 will operate as long as relays 204, 211 and 216 are not operated. If these relays are operated lamps 2—3 will operate to indicate that testing is taking place between switches 11 and 21.

If unstandard conditions exist in the multiple connections between the terminals of the tested switches or if any one of the frames of these switches is grounded, the test circuits will stop functioning and the selectors will remain in the position where the trouble is encountered.

For example, if there is a ground connection on the frame of any one of the tested selectors relay 310 will operate from battery through the "frame ground" key 327, winding of relay 310, ground on lead 36, if the frame of switch 1 is ground or on lead 45 if the frame of the switch 11 is ground or on lead 54 if the frame of switch 21 is ground. Relay 310 in operating opens at the outer right hand armature and back contact the circuit from ground at the left hand armature and back contact of relay 311 for the operating circuits of the rotary magnets.

If any of the multiple leads between the testing switches are open, the tip and ring multiple connections, for example, then the corresponding lamps T or R are not lighted. In such a case the relay 314 will not operate and hence cause the switch to stop on the terminals of the defective connections.

If any of the multiple connections are reversed, the corresponding reverse lamp will be lighted. For example, in case the reverse lamp TR lights, the conditions would be such that the ground connection that is normally on the ring brush of switch 1 through lead 29 will be supplied through the tip brush of switch 11 and lead 37 thus preventing the operation of relay 203 through the resistance 205. When this takes place the reverse lamp TR will light from battery at the fourth upper armature and back contact of relay 204, which naturally will not be operated at this time, through the reverse lamp TR, upper inner armature and back contact of relay 207, lower armature and back contact of relay 203, key 200, lead 37, reverse connection, lead 29, key 200, upper inner armature and back contact of relay 204, to ground on lead 208. Relay 207 will of course not operate under these circumstances as the normal ground over lead 29 will not be supplied to lead 38 and the ring brush of switch 11, and as the tip brush of switch 1 is connected through the ring brush of switch 11 and lead 28 through relay 202 to battery no operating circuit for this latter relay will be completed. Similarly, the reverse lamp $T_1R_1$ or reverse lamp $SS_1$ will light if the corresponding relays fail to operate due to reverses on any of the other multiple connections between switches 1 and 11 or for that matter between switches 11 and 21, depending on the switches tested at the time.

If any of the multiple connections are short-circuited, relays 202, 210 or 217 will operate to light the corresponding lamp TR, $T_1R_1$ or $SS_1$. For example, if a short-circuit exists between the tip and ring conductors, relay 202 will operate. Relay 202 will operate from ground through lead 28, tip brush of switch 1, and through the short-circuit to ring brush of switch 1 and lead 29 to ground. In this case lamp TR will light to indicate a short-circuit between these two conductors. Due to the operation of this relay and the non-operation of relay 203, relay 314 will not operate and the switch will stop on the terminals on which the trouble occurs. Relay 203 will in this case be shunted by the ground on lead 29 from the ring brush of switch 1 through the short-circuit to the tip brush of switch 11 and lead 37 while relay 207 will operate through the short-circuit thus preventing the reverse lamp TR from lighting at this time. Similarly the lamps $T_1R_1$ and $SS_1$ would light if the short-circuit existed between the $T_1$ and $R_1$ multiple connection and the S and $S_1$ multiple connection.

If any of the above unstandard conditions exist and it is decided to continue to the test, the frame ground key 327 will be operated in case ground exists in any of the frames to release relay 310 to permit the test to continue. If any of the other troubles occur the trouble key 206 will be operated to remove the ground connection for relays 203, 209 and 214 or 312 and to place ground on a circuit for relay 314. Relay 314 in operating causes the test to be continued as hereinbefore described.

If no unstandard conditions exit, the tests may proceed from one set of terminals to another in the first level of switches 1, 11 and 21 in the manner described above. When the tenth set of contacts is reached and tested selector 401 will have its brushes located in position 12. In this position the brush of bank 417 will supply ground for the operation of relay 317 which in turn causes the operation of relay 303. This relay provides battery connections for the vertical and rotary magnets. At this time a circuit for the vertical magnets of switches 1, 11 and 21 is provided as follows: from the battery supply at key 301 through the vertical magnets over conductors 34, 43 and 52 key 200, through the winding of relay 319, key 325, brush of bank 422, position 3 of selector 411, brush of bank 416 of selector 401, positon 12, outer right hand armature and back contact of relay 314, left hand armature and front contact of relay 309, brush of bank 415, position 12, outer right hand armature and back contact of relay 310, left hand armature and back contact of relay 311 to ground. It should be remembered that relay 309 is operated at this time, being held by ground on brush of bank 403, position 12, said ground being supplied from the right hand armature and front contact of relay 317. Relay 314 is released at this time.

It should be noted that the circuit traced for the vertical magnets passes through the winding of relay 319. The vertical magnets will be only partially operated at this time due to the resistance of the winding of relay 319, so as to prevent the switches from releasing in the vertical direction. That is, the pawls of the vertical magnets will engage the second tooth on the shaft of the switch but will not cause the shaft to be lifted to bring the brushes to the second level at this time. Relay 319, however, operates in the circuit and causes the operation of relay 302 over an obvious circuit. Relay 302 in operating closes a circuit for the operation of the release magnets of switches 1, 11 and 21. This circuit may be traced from battery through the armature and front contact of relay 302 and second right hand armature and front contact of relay 319, winding of relay 322 and lead 60, which is multipled to all three release magnets 108, 109, 110 of the switches 1, 11 and 21, through the windings of their release magnets and a multiple connection to ground. Thus, switches 1, 11 and 21 will be released in a rotary direction but not in a vertical direction due to the above mentioned partial operation of the vertical magnets 101, 102 and 103.

The brushes of these switches will now be advanced by the full operation of the vertical magnets as follows: relay 322 operates in the release circuit and closes a circuit for the operation of relay 323 as follows: battery, winding of relay 323, armature and front contact of relay 322, brush of bank 410, position 3 of selector 411, contacts of key 305, inner left hand armature and back contact of relay 306. Relay 323 provides a locking circuit for itself through its inner left hand armature and front contact to ground at the brush of bank 402, position 12 of selector 401. Relay 323 in operating closes an obvious circuit for the operation of relay 316 from ground at relay 311. Relay 316 in operating closes a shunt around relay 319 so that the vertical magnets of all three switches are now operated fully and thus advance the brushes of these switches to the second level of terminals.

Relay 319 is released by this shunt circuit causing relay 302 to release. This relay is slow in releasing to permit the vertical magnets to operate before selector 401 is actuated to shift its brushes to position 13. Relay 319 in releasing closes a circuit for the operation of relay 311 as follows: battery, winding of this relay, outer right hand armature and back contact of relay 319, middle left hand armature and front contact of relay 323 to ground at the brush of bank 402. Relay 311 in operating opens the connection to ground for lead 208 and closes a connection to ground for the operation of rotary magnets 104 and 105 of switches 1 and 11, at this time to advance their brushes to the first set of terminals in the second level. This will take place before relay 302 is released to operate magnet 400 to shift the brushes of selector 401 from position 12 to position 13. When relay 302 does release a circuit for the operation of magnet 400 is completed as follows: battery, armature and back contact of relay 302, winding and self-interrupting contacts of magnet 400, outer left hand armature and back contact of relay 314, outer right hand armature and front contact of relay 309, inner right hand armature and front contact of relay 309, brush of bank 403, right hand armature and front contact of relay 317 to ground. When the selector 401 moves to position 13 the locking circuit for relays 309 and 323 are opened as well as the energized circuit for magnet 400. These relays release and relay 323 causes the release of relay 311. Relay 311 thus closes the circuit to ground for the testing relays 203, 207, etc. over lead 208, as hereinbefore described. The circuit for relay 317 is also opened at the switching of the selector 401 into position 13 and this relay in turn causes the release of relay 303 to remove the battery connections for the vertical and rotary magnets.

The testing of the first set of terminals in level 2 of switches 1 and 11 will now take place. This set of terminals and the succeeding sets of terminals in this level are tested in the same manner as terminals in the first level. During this testing the selector 401 passing from position 13 to 22 and the selectors 406 and 411 pass respectively into position 4. The selector 406 lights lamp 2 in the group 419 to indicate that testing is taking place in the second level while selector 401 lights the units lamps 413 from 1 to 0 in succession as the test proceeds.

The test will not proceed from one level to another as outlined above except that when the switches advance to the third level the selector 401 will advance its brushes from position 22 into position 1 in the same manner as it is advanced into position 13, and selector 406 is advanced into position 5. The selector 401 will then automatically advance the brushes into position 3. A circuit will be completed for magnet 400 as follows:

Battery at the armature and back contact of relay 302, winding and self-interrupting contacts of magnet 400, outer right hand armature and back contact of relay 311, brush of bank 422, position 5 to ground at the brush of bank 417, position 1. From this position the selector 401 is advanced into position 2 where this circuit is again completed for magnet 400 and the switch is thereby advanced to position 3 where the tests in the third level may begin. It will therefore be seen that the selector 401 will advance from positions 3 to 12 for the first level, 13 to 22 for the second level, position 1 to 3 automatically and then proceed with the testing of the third level advancing from positions 3 to 12 and the fourth level of position 13 to 22.

When the testing in the tenth level is completed no circuit is furnished for the vertical magnets through relay 319 and consequently, the circuits above mentioned, starting with the operation of relay 319, are not completed. The selector 401 therefore remains in position 1 with the selectors 406 and 411 in their twelfth position. Under these conditions relay 306 is operated over a circuit as follows: battery, resistance 324, winding of relay 306, brush of bank 423, position 12, brush of bank 402, position 1 of selector 401 to ground. This relay is locked through its own inner left hand armature and front contact to ground over the brush of bank 423, position 12. The operation of this relay provides a battery connection for the release magnets at the outer left hand armature and front contact and through the winding of relay 322. The switches 1, 11 and 21 are thereby released to normal position.

With relay 306 operated a connection is established for magnet 408 from battery through the winding and self-interrupting contacts of this magnet through the third outer right hand armature, and front contact of relay 306 to the brush of bank 425, position 12, brush of bank 426, position 2 of selector 427 to ground at the third outer left hand armature and front contact of relay 306. This circuit will be completed for each step of the brush 425 through the succeeding contacts thereof to cause switch 406 to return to normal position 2. When selector 406 is in position 2 a circuit is completed for the return of selector 401 to normal position 2 as follows: from battery, armature and back contact of relay 302, winding and self-interrupting contacts of magnet 400, second outer right hand armature and front contact of relay 306, brush of bank 431, positions 22 and 1, brush of bank 425, position 2, brush of bank 426, position 2, third outer left hand armature and front contact of relay 306 to ground. A circuit is completed for magnet 414 of selector 411 as follows. Battery, winding and self-interrupting contacts of magnet 414, outer right hand armature and front contact of relay 306, the brush 430 of selector 411, position 12, brush of bank 431, position 2 of selector 401, brush of bank 425, position 2 of selector 406, brush of bank 426, position 2 of selector 427 to ground at the third outer left hand armature and front contact of relay 306. Since terminal 1 and terminals 3 to 22 inclusive are strapped together, magnet 414 continues to operate and release until this switch is returned to normal, position 2. When all of the selectors have returned to normal the circuit for relay 306 is shunted through the brush of bank 430 at position 2 to the ground furnished through banks 431, 425 and 426 and when relay 306 is released a circuit is completed for the lighting of lamp 326 from ground through the lamp, the third outer armature and back contact of relay 306, banks 426, 425, 431 and 430 to battery through resistance 324. The lighting of this lamp indicates that the switches are in normal position and that the testing of the switches 1, 11 and 21 has been completed.

To test switches 2, 12 and 22 the transfer key 200 is operated. The leads extending to switches 1, 11 and 21 are thereby opened and corresponding leads connected to the brushes, frames and operating magnets of switches 2, 12 and 22. The testing of these switches may now proceed in the same manner as the testing of the preceding switches and the testing is started by operating the start key 300.

While these switches are being tested the test man may disconnect the leads from switches 1, 11 and 21 and connect them to switches 3, 13 and 23 respectively and when the testing of switches 2, 12 and 22 is completed the switches 3, 13 and 23 may be tested by returning the transfer key 200 to normal and while these switches are being tested the leads for switches 2, 12 and 22 are disconnected by the test man and connected to the switches 4, 14 and 24, etc. until the whole group of thirty switches have been tested. In this manner the testing of a group of thirty switches may be completed by originally connecting two groups of three switches each to the transfer keys and changing the connections from one group of three switches at a time eight successive times.

In testing a group of twenty switches the procedure is the same as in the testing of a group of thirty switches except that key 201 is operated to open the connections for the leads that would ordinarily be connected to a third switch such as switch 21 and these leads are of course not used in this connection. Key 325 is also operated to close its lower contacts. In this case relay 204, 211 and 216 are not operated to switch the testing from between the first and second switches to testing between the second and a third switch as no third switch is connected for testing. In this case the operating circuits for these relays are opened by the operation of key 201 and consequently relays 312 or 313 will not operate and neither will lamps 2—3 be lighted. Relay 314 instead of operating through contacts of relay 313 will be operated through contacts of key 201 to switch the selectors from one position to another to control the tests of succeeding sets of terminals. It should also be noted that with key 325 operated as described above, the circuit for partially operating the vertical magnets includes resistance 320; this additional resistance is required since in this case only two vertical magnets are operated in parallel instead of three being operated in parallel as is the case when testing a group of thirty switches. It is believed that no further description is necessary in regard to the testing of a group of twenty switches, in view of the above remarks and the previous complete description of the procedure in testing a group of thirty switches.

In testing a group of 16 switches the procedure is the same as in testing a group of 20 switches as far as the testing of switches 1 to 6 and 11 to 16 is concerned. When the testing has been completed to this point switches 7 and 9 and 8 and 10 are tested in a similar manner but with a few minor differences in the circuit arrangement which will be hereinafter pointed out.

At this time keys 305 and 201 are operated and key 325 is in normal position. The switches 7 and 8 are in this case connected as switches 11 and 12 respectively shown in Fig. 1, while switches 9 and 10 are connected as switches 1 and 2 respectively shown in Fig. 1. The first effect from the operation of key 305 is that the vertical magnet of switch 7 or switch 8, depending on the operation of the transfer key 200, will now receive an actuating impulse through the operated left-hand contacts of key 305. The circuit may be traced, for example, from the vertical magnet of switch 7, through lead 43, transfer key 200, key 305, brush of bank 433, position 2, brush of bank 402, position 3 to ground. It should be noted that the selector 401 will have its brushes in position 3 at this time having been operated and returned to this position thirty successive times during the testing of the other 12 switches. Selector 427 will now step from position 2 into position 3 at the same time as selector 406 is stepped from position 2 into position 3 over a circuit as hereinbefore traced. The circuit for magnet 434 of selector 427 may be traced from battery through the magnet 434 and its self interrupting contacts, left-hand armature and front contact of relay 304, brush of bank 436, position 2, right-hand closed contacts of key 305, to ground at the inner left-hand armature and contact of relay 306. In the case of the vertical magnet of switch 9 or 10, the first actuating impulse will be received through a circuit closed in the same manner as before, that is, through brush of bank 407, position 2 and bank 402, position 3 to ground.

With selector 427 in position 3, relay 303 is operated over a circuit from ground through brush of bank 409 to continue to feed battery to the vertical magnets. It should be noted that this relay is also operated for the same purpose as the selector passes from position 3 through positions 4, 5 and 6. Selector 427 in position 3 also closes an operating circuit for its stepping magnet 434 to step it into the fourth position. This circuit may be traced as follows: battery, winding and the self-interrupting contacts of magnet 434, brush of bank 436, position 3, key 305 to ground at relay 306. With selector 427 in position 4 a circuit is closed for transmitting a second impulse for the vertical magnet of switch 7 or 8. This circuit will be closed through key 305, brush of bank 433, position 4, brush of bank 402, position 3 to ground. At the same time a circuit is closed for the operation of relay 326 from battery, through the winding of this relay, brush of bank 435, position 4, key 305 to ground at relay 306. This relay, however, is slow to operate so that ample time is allowed for the operation of the vertical magnet of switch 7 or 8 the second time over the above circuit. Relay 326 in operating closes a circuit for selector 427 to advance it to the fifth position. The circuit in this case will be from battery through the winding and self-interrupting contacts of relay 434, armature and front contact of relay 326, brush of bank 435 position 4, key 305 to ground at relay 306. In this position relay 326 is released and selector 427 closes a circuit for moving it into the sixth position as follows: from battery, through the winding and self-interrupting contacts of magnet 434, brush of bank 436, position 5, key 305 and ground at relay 306. In position 6 a circuit is closed for the third time for the vertical magnet of switch 7 or 8 over the brush of bank 433, position 6, and the above mentioned circuit for relay 326 is again closed through the brush of bank 435. Relay 326 in operating closes a circuit for magnet 434 through brush of bank 435, position 6, to advance the switch 427 into its seventh position. Relay 326 is now again released.

In position 7 a circuit is closed for the rotary magnet of switch 7 or 8 and also for switch 9 or 10. This circuit may be traced as follows: at the transfer key 200 from lead 35 or 8 for rotary magnet of switch 9 or 10 and from lead 34 or 17 for rotary magnet of switch 7 or 8, through brush of bank 412, position 2, brush of bank 413, position 3, brush of bank 435, position 7, key 305 to ground at relay 306. Relay 308 will be operated at the same time, over a circuit from battery, winding of relay 308, rush of bank 409, position 3, brush of bank 410, position 2, brush of bank 435, position 7, key 305 to ground at relay 306. This relay in operating closes a circuit for the stepping of selector 411 into position 3 as follows: battery, winding and self-interrupting contacts of magnet 414, armature and front contact of relay 308, brush of bank 410, position 2, brush of bank 435, position 7, key 305 to ground at relay 306. The testing from this point on will proceed as for a 20 switch unit until the eighth levels of the switches have been tested.

It should be pointed out at this time that the vertical magnet of switch 7 or 8 has now been operated three times while the vertical magnet for switch 9 or 10 has operated once. The vertical and rotary magnets of switches 7 or 8 and of switches 9 or 10, will from this point on operate in the same manner as the 20 switch units test. The testing will therefore start in the cases of switches 7 and 8 on the third level and in the cases of switches 9 and 10 on the first level. The testing will now proceed until the eighth level of switch 9 or 10 and until the tenth level of switch 7 or 8 is tested. From this point the testing will proceed as follows: The first level of switch 7 or 8 will be tested with the level 9 of switch 9 or 10 and the second level of switch 7 or 8 will be tested with the level 10 of switch 9 or 10. The circuit in which the vertical magnet of switch 7 or 8 is partially operated, after the test of the tenth set of contacts in levels 3 to 9 inclusive, is traced from its winding over lead 43 or lead 16, through key 200, left-hand normally open contacts of key 305, terminal 7 and brush of bank 438, brush of bank 439 in any of positions 3 to 9 inclusive, winding of relay 319, resistance 320, any one of terminals 3 to 9 inclusive, and brush of bank 422, terminal 12 or 22 and brush of bank 416, back contact of relay 314, front contact of relay 309, brush of bank 415, back contact of relay 310, and back contact of relay 311, to ground. The circuit in which the vertical magnet of switch 9 or 10 is partially operated, after the test of the tenth set of contacts in levels 1 to 8, is traced from its winding over lead 34 or lead 7, through key 200, to the winding of relay 319, and thereafter the same as the circuit for the vertical magnet of switch 7 or 8. The purpose of arranging the testing in this manner for the last four switches in a 16 switch unit is that the multiple connections between the switches are slipped so that for example, the multiple connections from the terminals in the third level of switches 7 and 8 will be extended to the terminals in the first level of switches 9 and 10. This stepping arrangement is of no particular importance of itself but simply serves as a means of illustrating how the invention may be applied to the testing of switches having slipped multiple connections.

When the release magnets of switches 7 or 8 and 9 or 10 are operated, after testing the connections between the tenth level of switch 7 or 8 and the eighth level of switch 9 or 10, it is necessary to insert an additional resistance 437 in series with the relay 319 and resistance 320 in the circuit of the vertical magnet of switch 9 or 10 so as to only partially energize this vertical magnet and thus permit the restoration of the brushes of switch 9 or 10 in a rotary direction only, while the brushes of switch 7 or 8 are being restored in both the rotary and the vertical directions. If resistance 320 only was inserted in the circuit for the vertical magnet of switch 9 or 10 it might be energized to such an extent as to have the pawl thereof drag or bind on a vertical tooth and hence interfere with the rotary release. For this reason the arrangement is such that the additional resistance 437 is included in the circuit for the vertical magnet of switch 9 or 10 while circuit for the vertical magnet of switch 7 or 8 is opened to permit the corresponding switch to return to normal and this circuit is later again closed to cause the corresponding magnet to operate fully to continue the test in levels 1 and 2.

This additional resistance is inserted as noted while the selector 411 is in its tenth position as key 325 is released. It will be observed that the circuit of vertical magnet for switch 9 or 10 will at this time be traced as follows: from either of these magnets over lead 34 or 7 through key 200, winding of relay 319, resistance 320, resistance 437, brush of bank 422, position 10, brush of bank 416, position 22, back contact of relay 314, front contact of relay 309, brush of bank 415, position 22, back contacts of relays 310 and 311 to ground. No circuit is completed at this time for the vertical magnets of switch 7 or 8 as the normal circuit through key 305 is opened at the brush of bank 436 due to the fact that selector 427 is in its seventh position.

Switch 7 or 8 will therefore now release in the usual manner from the tenth level while switches 9 and 10 will continue to be tested through the ninth and tenth levels. When the switch 7 or 8 has released its vertical magnet it will again receive full potential due to the operation of relay 323 in the usual manner. The circuit in this case will be as follows: vertical magnet of switch 7 or 8, lead 43 or 16, transfer key 200, key 305, brush of bank 438, position 7, brush of bank 439, position 10, right-hand armature and front contact of relay 323, ground at the armature and front contact of relay 316. Relay 316 is operated in the usual manner to cause the full operation at this time also of the vertical magnet of switch 9 or 10 so that the testing will proceed as usual through the ninth and tenth levels of these switches in unison with the first and second levels of switches 7 or 8.

When the tenth level has been tested in the switch 9 or 10 and the second level in the switch 7 or 8 these switches are returned to normal. The switch 9 or 10 will return in the usual manner and the switch 7 or 8 will return as follows: When the selectors 401, 406 and 411 are returned to normal, relay 306 will not release as usual as the short-circuit that is ordinarily completed across its winding, through resistance 324 and through these selectors when in position 2 will not be completed at this time through the brush of bank 426 as this selector is not yet returned to normal. A circuit will however now be completed for the return of selector 427 as follows: battery, winding and self-interrupting contacts of magnet 434, second outer left contact of relay 306, through the succeeding contacts of the remaining positions of selector 427 and to the brush of bank 426, third outer left-hand contact and armature of relay 306 to ground. When selector 427 has returned to normal relay 306 is short circuited and releases and consequently the circuits of the system are restored to normal as hereinbefore described in connection with 20 and 30 switch units.

It should be understood that, while the invention has only been illustrated in connection with testing of switches, it is not confined to these arrangements but may readily be applied in other systems without departing from the spirit thereof, and that the invention should only be limited by the scope of the appended claims.

What is claimed is:

1. A plurality of switches, wipers therefor, means for moving the wipers of two switches in synchronism in a primary movement in one direction followed by a secondary movement in another direction, means for releasing said switches in regard to the secondary movement, and means for continuing the primary movement and repeating said movements in the order mentioned.

2. A plurality of switches, wipers therefor, terminals in said switches arranged in levels, means for moving the wipers of two switches in synchronism over the terminals of succeeding levels, means for releasing said switches, and means operative after said release for moving the wipers of one of said switches and another switch in synchronism over the terminals of the succeeding levels.

3. A plurality of switches having two-direction wipers, individual means for controlling the wipers of two switches simultaneously to execute a vertical movement followed by a rotary movement, means for releasing said wipers as regards both movements, and means for preventing said release as regards the vertical movement.

4. A switch having two-direction wipers, a first magnet for controlling the wipers in a first movement, a second magnet for controlling the wipers in a second movement, means for releasing said wipers as regards both movements and means for controlling the first magnet to prevent the release as regards the first movement from becoming effective.

5. Switches having their wipers movable in two directions and their corresponding sets of terminals multipled, in combination with a testing device comprising means for moving the wipers of two of said switches at a time to simultaneously engage their corresponding sets of terminals for the testing of the multiple connections therebetween, and means controlling the movement of said wipers in the two directions to prevent the release to normal while changing from one direction to the other.

6. Switches having their wipers movable in two directions and their corresponding sets of terminals arranged in layers and multipled together, in combination with a testing device comprising means for controlling the movement of wipers of two switches to cause said wipers to simultaneously engage their corresponding sets of terminals in the succeeding layers, and means to prevent the wipers from returning to normal while shifting from one layer to another.

7. A plurality of multi-level switches, sets of wipers in each switch, sets of terminals in each level of said switches accessible from the corresponding sets of wipers, means for causing the sets of wipers of two switches to move in synchronism in one level over the sets of terminals therein, means effective when said sets of wipers reach their limit of motion for restoring the wipers to their position opposite said levels and for moving said wipers to the corresponding succeeding levels, said movement automatically continuing from level to level over the corresponding sets of terminals in succession.

8. A plurality of switches comprising sets of terminals divided in groups, a corresponding set of wipers for each switch, a primary magnet for each switch, a secondary magnet for each switch, means for operating said primary magnets to direct the corresponding wipers from group to group, and means for operating said secondary magnets for directing the corresponding wipers over the sets of terminals in said groups, and means for controlling the movements of said magnets of two switches to operate in synchronism and to automatically continue the actuation of the wipers to travel over the sets of terminals in succeeding groups.

9. A plurality of switches having multiple connections between their terminals, a testing device, means for connecting three switches to said testing device, and means for causing said device to test the connections between the first and the second of said connected switches and thereafter the connection between the second and the third of said connected switches.

10. A plurality of switches having multiple connections between their terminals, means for testing for unstandard conditions in the multiple connection between any pair of switches, means for connecting a first and a second pair of switches to said testing means simultaneously, and means for switching the testing means from the first pair of switches when tested to the second pair for testing.

11. A plurality of switches having multiple connections between their terminals, means for testing for unstandard conditions in the multiple connection between any pair of switches, means for connecting a first and a second pair of switches to said testing means simultaneously, means for switching the testing means from the first pair of switches when tested to the second pair for testing, and means for connecting a third pair of switches to said testing means while the second pair is being tested.

12. A plurality of switches, wipers therefor, terminals in said switches arranged in levels, multiple connections for the corresponding terminals of succeeding switches, means for moving the wipers of two of said switches in synchronism over the corresponding terminals of succeeding levels, and means for indicating unstandard conditions in the multiple connection when the wipers make contact with corresponding terminals of the two switches.

13. A plurality of switches having terminals arranged in levels, multiple connections between the corresponding terminals of said switches, means for testing for unstandard conditions in said multiple connections between any pair of switches, means for indicating any unstandard conditions encountered during testing, and means for indicating the progress of a test comprising signals actuated to indicate the sets of terminals being tested and the level in which they are located.

In witness whereof, I hereunto subscribe my name this 22nd day of October, 1928.

WILLIAM BRESTERS.